United States Patent Office 3,175,951
Patented Mar. 30, 1965

3,175,951
ORAL COMPOSITIONS FOR CARIES PROPHYLAXIS
Nathaniel B. Tucker, Glendale, Marion D. Francis, Springfield Township, Hamilton County, and William J. Griebstein, Mount Healthy, Ohio, assignors to The Procter & Gamble Company, Cincinnati, Ohio, a corporation of Ohio
No Drawing. Filed Nov. 8, 1963, Ser. No. 322,535
9 Claims. (Cl. 167—93)

This invention relates to improved compositions for caries prophylaxis. More particularly, it relates to oral compositions for caries prophylaxis which contain certain water-soluble fluorides together with low levels of indium (III) ion. It further relates to a method of inhibiting the demineralizing effect of acidic fluoride solutions on dental enamel.

By the term "oral composition" as used herein is meant a product which in the ordinary course of usage is not intentionally ingested, but is retained in the oral cavity for a time sufficient to contact substantially all of the dental surfaces. Such products include, for example, dentifrices, mouthwashes, chewing gums, and dental prophylaxis pastes and topical solutions for application in the dental office. The oral compositions for caries prophylaxis herein contemplated do not require ingestion for anti-caries effect.

The efficacy of fluorine in caries prophylaxis is well established, to the extent that the topical application of aqueous solutions of various soluble fluorides has become a routine procedure in many dental offices and clinics. More recently, a toothpaste containing stannous fluoride has been recognized as effective against caries by the American Dental Association.

Although the mechanism whereby fluorine protects the teeth from caries is not definitely known, it appears that fluoride ion in dilute solution reacts with the hydroxylapatite of the dental enamel to form fluorapatite, the reaction proceeding as follows:

$$Ca_5(PO_4)_3OH + F^- \rightarrow Ca_5(PO_4)_3F + OH^-$$

Treatment of the dental enamel with more concentrated solutions of fluoride yield calcium fluoride as a product:

$$Ca_5(PO_4)_3OH + 10F^- + 3H^+ \rightarrow 5CaF_2 + 3HPO_4^= + OH^-$$

In either case the reaction product formed on the tooth surface is less susceptible to acid attack than the unmodified tooth substances. Demineralization of dental enamel by the biologically produced acids of the oral cavity is thereby reduced and initiation of caries is less likely to occur. The cation of the fluoride salt can also react with the dental enamel to yield the corresponding orthophosphate to influence enamel solubility.

A variety of fluorine compounds, both inorganic and organic, have been suggested for use as anti-caries agents. In order to produce a maximum reduction in enamel solubility, it is desirable to maintain the composition containing the fluoride in the acid pH range, preferably below pH 6. It has been found, however, that most fluoride salts alter dental enamel in an undesirable way, some more than others, when used in oral compositions having the desired acidity for anti-caries efficacy. For example, the application to dental enamel of sodium fluoride in aqueous solution at pH 5 causes severe demineralization of the tooth structure which is manifested by a high degree of phosphate release and marked changes in the appearance of the tooth surface. In this manner, the fluoride anti-caries agent can in many cases have essentially the same undesirable effect as the natural demineralization which it is intended to minimize. Sodium fluoride and many other fluorides which share this defect are otherwise highly desirable by reason of their widespread availability, economy, and efficacy in reducing enamel solubility.

It is, therefore, an object of this invention to provide improved oral compositions for caries prophylaxis.

It is a further object of this invention to provide oral compositions for caries prophylaxis which reduce the solubility of dental enamel but have a reduced tendency to demineralize the tooth structure.

It is a still further object of this invention to provide a method of inhibiting the alteration of the tooth structure by acidic fluoride solutions.

It has now been found that these and other objects can be attained with oral compositions which contain in addition to a water-soluble, dental enamel solubility reducing fluoride certain surprisingly low concentrations of indium (III) ion.

In general terms, the oral compositions of this invention are comprised of (1) at least one water-soluble dental enamel solubility reducing fluoride which in acidic aqueous solution demineralizes dental enamel, and (2) a water-soluble source of indium (III) ions, the weight ratio of indium to fluorine in said composition being within the range from 1:1 to 1:2000, the pH of said composition being within the range from about 2.5 to 6.0.

A wide variety of fluoride salts can be used in the compositions of this invention. Specifically, any water-soluble fluoride salt which is capable of providing at least 25 p.p.m. of fluoride ion in aqueous solution and which reduces the solubility of dental enamel, can be used to realize the benefits of this invention.

Among the fluoride salts contemplated for use in this invention are the following:

INORGANIC FLUORIDES

| | |
|---|---|
| Sodium fluoride | Lead fluoride |
| Potassium fluoride | Ferric fluoride |
| Lithium fluoride | Nickel fluoride |
| Cesium fluoride | Palladium fluoride |
| Ammonium fluoride | Silver fluoride |
| Aluminum fluoride | Zinc fluoride |
| Cupric fluoride | Zirconium fluoride |

ORGANIC FLUORIDES (I) Water-soluble amine hydrofluorides of the formula:

(A) 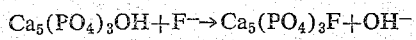

(B) 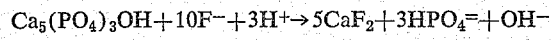

(C) 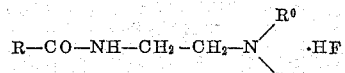

(D) 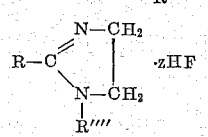

(E) 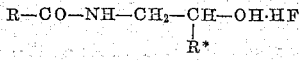

(F) 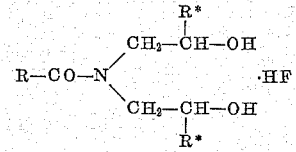

(G) 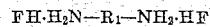

and (II) 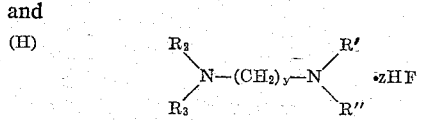

wherein R is a member selected from the group consisting of alkyl, alkoxy, alkenyl, alkylol and aralkyl radicals of not more than 20 carbon atoms; $x$ is a positive integer of at most three; $y$ is a positive integer of at most three; $R^0$ is a member selected from the group consisting of hydrogen, alkyl, alkenyl, alkylol, aralkyl and cycloalkyl radicals; each of R', R", and R''' is a member selected from the group consisting of hydrogen, alkyl, alkoxy, alkylol, alkenyl, acyl, arakyl, and cycloalkyl radicals; R'''' is a member selected from the group consisting of hydrogen, alkyl, acyl, alkenyl, alkylol, aralkyl and cycloalkyl radicals; R* is a member selected from the group consisting of hydrogen and lower alkyl radicals; $R_1$ is an alkylene radical of not more than 20 carbon atoms; $R_2$ is a member selected from the group consisting of alkyl and alkenyl radicals of not more than 20 atoms; $R_3$ is a member selected from the group consisting of alkyl, alkoxy, acyl, alkenyl, alkylol, aralkyl and cycloalkyl radicals; and is a positive integer of at most two.

Examples of amine hydrofluorides which are encompassed by the above formulae and are suitable for use in the compositions of this invention are:

Hexylamine hydrofluoride
Laurylamine hydrofluoride
Myristylamine hydrofluoride
Decanolamine hydrofluoride
Octadecenylamine hydrofluoride
Myristoxyamine hydrofluoride
Dietheyaminoethyloctoylamide hydrofluoride
Diethanolaminoethyloleylamide hydrofluoride
Diethanolaminopropyl-N'-octadecenylamine dihydrofluoride
1-ethanol-2-hexadecylimidazoline di hydrofluoride
Octoylethanolamine hydrofluoride Those compounds of this class which contain at least one hydrocarbon radical such as an alkyl, alkylol, alkenyl or alkylene radical having from 8 to 20 carbon atoms are especially preferred for use in the compositions of this invention because of their surface active properties. These and other operable amine hydrofluorides as well as a method for their preparation are disclosed by Schmid et al. in U.S. Patent 3,083,143, granted March 26, 1963.

(II) Water-soluble quaternary ammonium fluorides having an atomic grouping of the formula:

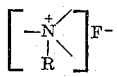

where R represents an alkyl, alkenyl, alkylol, alkoxyalkyl, aryl, aryloxyalkyl, aralkyl, cycloalkyl, cycloalkenyl or heterocyclic radical, or an additional quaternary ammonium radical which may be attached to the nitrogen atom by a bridging group, or a radical of the formula —R₄—CO·Y where Y represents OH, alkoxy, cycloalkoxy, aralkoxy or

where $R_4$ stands for an alkylene or arylenealkylene radical and each of the symbols $R_5$ and $R_6$ represents hydrogen, or an alkyl, alkenyl, alkylol, aryl, aralkyl, cycloalkyl or heterocyclic radical, or $R_5$ and $R_6$ form together with the nitrogen atom a heterocyclic nucleus, each one of the three free valences being satisfied by an alkyl, alkenyl, alkylol, alkoxyalkyl, aryl, aryloxyalkyl, aralkyl, cycloalkyl, or heterocyclic radical, or two of the free valences being satisfied by a group forming, together with the nitrogen atom, a saturated or unsaturated, unsubstituted or substituted heterocycic nucleus. The following are specific examples of operable fluorides of this class: Octyl-trimethyl-ammonium fluoride, dodecyl-ethyl-dimethyl-ammonium fluoride, tetraethyl ammonium fluoride, dilauryl - dimethyl - ammonium fluoride, Δ⁸, ⁹-octadecenyl-benzyl-dimethyl-ammonium fluoride, dioctyl-diethyl-ammonium fluoride, cyclohexyl-cetyl-dimethyl-ammonium fluoride, furfuryl-lauryl-dimethyl ammonium fluoride, phenoxyethyl-cetyl-dimethyl ammonium fluoride, N:N'-tetramethyl-N:N'dilauryl-ethylene-diammonium difluoride, N-cetyl-pyridinium fluoride, N:N-dilauryl-morpholinium fluoride, N-myristyl-N-ethyl-morpholinium fluoride, N-(octylamino-carbonyl-ethyl)-N-benzyl-dimethyl-ammonium fluoride, N-(β-hydroxy-dodecyl)-trimethyl-ammonium fluoride, N-phenyl-N-hexadecyl-diethyl-ammonium fluoride, N-cyclohexyl-N-octadecyl-dimethyl-ammonium fluoride, N-(2-carbomethoxy-ethyl)-N-benzyl-dimethyl-ammonium fluoride, N-(2-carbocyclohexoxy-ethyl)-N-myristyl-dimethyl-ammonium fluoride, N-(2-carbobenzyloxy-ethyl)-N-dodecyl - dimethyl - ammonium fluoride, N-[2-(N:N'-dimethylamino-carbonyl)-ethyl]-N-dodecyl-diethyl-ammonium fluoride, N-carboxymethyl-N-eikosyl-dimethyl-ammonium fluoride, etc. This class of compounds and methods for their preparation are disclosed in British Patent 865,272.

Compounds of the formula $$(HOC_xH_{2x})_nN^+(C_yH_{2y+1})_{4-n}F^-$$

wherein $x$ and $y$ are each integers from 1 to 4, and $n$ is an integer from 1 to 3, are encompassed by the above described class but have a greatly reduced tendency to cause sub-surface demineralization. Still these compounds, including, for example, dimethyl-diethanol ammonium fluoride, trimethylethanol ammonium fluoride, and methyl-triethanol ammonium fluoride, can be used to advantage in conjunction with indium (III) in the compositions of this invention and are, in fact, a preferred class of fluorides, methyltriethanol ammonium fluoride being especially preferred.

(III) Water-soluble addition compounds of amino acids and hydrofluoric acid or fluorides.

Examples of this class of fluorides include:

Betaine hydrofluoride
Sarcosine stannous fluoride
Alanine stannous fluoride
Glycine potassium fluoride
Sarcosine potassium fluoride
Glycine hydrofluoride
Lysine hydrofluoride
Alanine hydrofluoride
Betaine zirconium fluoride Additional operable examples of this class of compounds as well as a method for their preparation are disclosed by Schmid in Canadian Patent 594,553, granted March 15, 1960.

Each of the foregoing compounds is capable of providing 25 p.p.m. of fluoride ion in aqueous solution. When these salts are dissolved in water and adjusted to a pH of 6.0 or below the resulting solutions reduce the solubility of dental enamel, but can cause varying degrees of demineralization when applied to teeth. Each of these salts, therefore, is beneficially employed in conjunction with In (III) ion in accordance with this invention.

The organic fluorides and hydrofluorides can be used to special advantage in the compositions of this invention and are preferred because in addition to excellent anticariogenic properties, many of these compounds also impart good cleansing, foaming, and other beneficial properties to oral compositions containing them.

As hereinbefore stated, the fluoride to be useful in the compositions of this invention must be capable of providing at least about 25 p.p.m. of fluoride ion in aqueous solution. The quantity of this component which is used for efficacious results will vary depending on the type of oral compositions. For example, a dentifrice will preferably contain an amount of fluoride salt equivalent to about 100 to about 4000 parts of fluoride ion per million parts of dentifrice. Dental propylaxis pastes or topical solutions to be applied in the dental office on the other hand can contain up to about 7500 p.p.m. of fluoride ion in solution. Fluoride toxicity considerations, of course, dictate the lower maximum concentration for products intended for frequent application in an unsupervised procedure.

The In (III) ion can be provided by any non-toxic water-soluble indium salt which dissociates sufficiently to yield the requisite quantities of In (III) ion. Examples of suitable indium salts are $InCl_3$, $InF_3$, $In(ClO_4)_3$, $In(NO_3)_3$, and $In_2(SO_4)_3$.

The water-soluble indium salt must be present in a quantity sufficient to provide from about 1 to about 1000 p.p.m. of In (III) ion, preferably not more than 400 p.p.m. of In (III) ion, and a weight ratio of indium to fluorine within the range from 1:1 to about 1:2000. If the ratio of indium to fluorine is greater than 1:1 the objects of this invention will not be attained, since compositions containing higher levels of indium are not stable in the preferred pH range. Further, these higher indium concentrations reduce fluoride uptake of the dental enamel to too low a level to realize the full anti-cariogenic potential of the fluoride. If ratios less than about 1:2000 are used, damaging demineralization will not be inhibited. Preferably, the weight ratio of indium to fluorine will be within the range from about 1:7 to about 1:100.

The maximum effectiveness of the compositions of this invention is achieved when the pH is within the range from about 2.5 to about 6.0. As hereinbefore stated, the fluoride salts do not produce the desired reduction in enamel solubility at a pH above about 6.0. Below about pH 2.5 it is extremely difficult to formulate oral compositions which have acceptable flavor and sudsing properties. The preferred pH range for the purpose of this invention is from 4.5 to 5.5. The pH may be adjusted with acids such as hydrochloric acid, acetic acid, gluconic acid, citric acid, etc.

Demineralization of dental enamel can be visually observed by electron miscroscopy using the method of Grey et al., Journal of Dental Research, vol. 37, No. 4, pages 638–648, August 1958. Demineralization of tooth structure can also be observed by measuring the amount of phosphate released from a given area of dental enamel in the course of a standard exposure to an aqueous solution of the agent in question, in the following manner.

Enamel chips of uniform size (approximately 13 mm.$^2$) are cut from the labial aspect of bovine central incisors. These chips are then highly polished and mounted on plastic rods which are placed in the chuck of a motor set to run at 500 r.p.m. The motor is turned on and the rotating tooth chip is immersed ¾" into a treating solution contained in a 17 x 100 mm. sterile plastic tube. The extent of reaction of these materials with the enamel is determined after 20 minutes treatment by analyzing the treating solution for phosphate using the method of Martin and Doty.

The following table shows the relative demineralization occurring when aqueous solutions of representative inorganic and organic fluorides are contacted to dental enamel with and without In (III) ions as determined by measurement of $PO_4^\equiv$ release using the above-described method. In each case the In (III) ion was derived from $InCl_3$, except for Example XIII wherein $InF_3$ was employed.

Table 1

PHOSPHATE RELEASE FROM ENAMEL SURFACES BY TREATMENT WITH ACIDIC AQUEOUS FLUORIDE SOLUTIONS

| Example | Fluoride Salt | Concentration of Ion (p.p.m.) | | In/F Ratio | pH of Sol'n | $PO_4^\equiv/12.6$ mm.$^2$ (γg.) |
|---|---|---|---|---|---|---|
| | | F | In (III) | | | |
| I | NaF | 1,000 | | | 4.5 | 29.3 |
| | NaF | 1,000 | 50 | 1:20 | 4.5 | 4.2 |
| II | NaF | 954 | | | 2.5 | 41.7 |
| | NaF | 954 | 806 | 1:1.06 | 2.5 | 7.4 |
| III | $NH_4F$ | 1,000 | | | 4.5 | 35.3 |
| | $NH_4F$ | 1,000 | 50 | 1:20 | 4.5 | 2.7 |
| IV | TMA+F$^{-1}$ | 1,000 | | | 4.5 | 30.0 |
| | TMA+F$^{-1}$ | 1,000 | 50 | 1:20 | 4.5 | 4.7 |
| V | Leucine·HF | 1,000 | | | 2.8 | 40.0 |
| | Leucine·HF | 1,000 | 50 | 1:20 | 2.8 | 28.8 |
| VI | Leucine·HF | 954 | 806 | 1:1.06 | 2.5 | 9.8 |
| VII | Leucine·HF | 100 | | | 3.0 | 183.0 |
| | Leucine·HF | 100 | 100 | 1:1 | 2.8 | 3.4 |
| VIII | $TiF_4$ | 1,000 | | | 2.8 | 16.1 |
| | $TiF_4$ | 1,000 | 50 | 1:20 | 2.8 | 11.0 |
| IX | $TiF_4$ | 100 | | | 2.6 | 35.6 |
| | $TiF_4$ | 100 | 100 | 1:1 | 2.6 | 7.6 |
| X | $SrF_2$ | 50 | | | 3.5 | 32.5 |
| | $SrF_2$ | 50 | 25 | 1:2 | 3.5 | ($^3$) |
| XI | MTEA+F$^{-2}$ | 1,000 | | | 3.5 | 23.7 |
| | MTEA+F$^{-2}$ | 1,000 | 250 | 1:4 | 3.4 | 9.1 |
| XII | $ZnF_2$ | 1,000 | | | 4.0 | 4.7 |
| | $ZnF_2$ | 1,000 | 100 | 1:10 | 4.0 | 0.4 |
| XIII | AgF | 1,000 | | | 4.5 | 7.7 |
| | AgF | 1,350 | 806 | 1:1.68 | 4.5 | ($^3$) |

$^1$ Tetramethyl ammonium fluoride.
$^2$ Methyltriethanol ammonium fluoride.
$^3$ None found.

It is seen from the above table that the degree of demineralization caused by acidic aqueous fluoride solutions varies with the fluoride salt employed, the pH of the solution, and the fluoride concentration, but in every case is greatly reduced in the presence of In (III) ion. The anti-caries activity of the fluoride solutions of these examples is not impaired by virtue of the presence of In (III), however. If the weight ratio of In (III) to F is increased to 2:1 for example, these compositions will not demineralize the tooth structure to any greater extent, but will reduce the anti-cariogenic potential of the fluoride by impairing fluoride uptake by the dental enamel. Thus, it is important that this ratio not exceed 1:1.

An animal study was conducted to establish the effect of representative compositions of this invention on the incidence of caries in the following manner.

The composition to be tested was applied to the teeth of weanling Wistar strain rats with a small cotton swab. The animals were housed individually and were placed immediately on a fine particle cariogenic diet comprised of 32% non-fat dry milk, 63% sucrose, 2% dried liver extract, and 3% celluflour. Water and food were administered ad libitum through the course of the experiment. The test composition and control ($H_2O$) were assigned at random to one male and one female member of each of thirty litters such that posisble variation among litters and between sexes could be discounted in evaluation of results. The overall design was a balanced incomplete block. (See W. G. Cochran and G. M. Cox, Experimental Designs, 2nd Ed., p. 475, Plan 11.6, John Wiley & Sons, Inc., New York, 1957.) The test and control materials were applied twice a day for 14 days over a period of three weeks. At the end of the treatment period, all animals were sacrificed and their teeth were stained with 2% $AgNO_3$ to reveal the incipient carious lesions. The stained teeth and jaw bones were then removed and cleaned by autoclaving. The teeth were sectioned and examined microscopically and the individual carious lesions were graded using the method of Marthaller et al., "Planning and Evaluating Studies on Experimentally Produced Caries in Rats," Schweiz, Mscher, Zahnnk, 67, 755–776 (1957). At the conclusion of the experiment, the number of lesions and severity score for each treatment group was averaged and the percent reduction in caries based on the water control was calculated.

The concentration of fluorine and indium (III) and percent reduction in caries attained with the test compositions are set forth in Table 2 below.

Table 2

| Example | Composition (pH 5.0) | F, p.p.m. | In (III), p.p.m. | Percent Reduction |
|---|---|---|---|---|
| XIV | Methyltriethanol ammonium fluoride+indium chloride in aqueous solution | 1,000 | 30 | 59.3 |
| XV | Sodium fluoride+indium fluoride toothpaste.[1] | 1,075 | 150 | 54.1 |

[1] See the following table:

```
                                            Percent by weight
Indium fluoride ($InF_3 \cdot 3H_2O$) _____  .03
Sodium fluoride _____  .22
Abrasive (particulate melamine-urea-formal-
   dehyde resin) _____ 30.00
Sorbitol (30% in water) _____ 20.00
Glycerine _____ 21.64
Hexadecyl hydroxy sultaine _____  1.00
Hydroxyethylnitrilodiacetic acid _____  .046
Hydroxyethylcellulose _____  1.50
Saccharin _____  0.18
Flavor _____  0.85
Color _____  0.47
Water _____ Balance
pH 5.0.
```

It can be seen that representative compositions of this invention produce a substantial reduction in caries incidence when applied to the teeth of standard laboratory animals. Similar anticaries effect is shown by the other combinations of fluoride and indium salts encompassed by this invention. For example, the indium fluoride employed in the composition of Example XV can be replaced with an equivalent amount of $InCl_3$, $In(ClO_4)_3$,

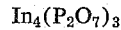

$In_4(P_2O_7)_3$ or $In_2(SO_4)_3$ without substantially effecting the anticaries efficacy of the composition.

The anticaries effect of the compositions of this invention was further demonstrated by the so-called "agar-saliva test" which simulates certain of the conditions existing in the human mouth. These tests were conducted as follows:

Sound extracted human teeth were cleaned, polished and cut into quadrants. Each quadrant was mounted on a ¼ inch plastic rod and the cementum area and cut surfaces of the quadrants were covered with wax to prevent contact and reaction of test compositions with any tooth surface but the enamel. The tooth quadrants were treated by immersing them in the test composition to which they were assigned, for a total of 20 minutes, stirring the composition throughout the exposure. Following treatment, the teeth were rinsed and then immersed in distilled water in separate containers where they remained until placed in a caries inducing medium which was prepared as follows:

An agar medium was prepared by mixing 6% by weight of Bacto-Tomato Juice Agar together with 5% by weight of Bacto-Dextrose (Difco Labs., Chicago, Ill.) in water. This mixture was then placed in tubes, sterilized and allowed to solidify.

Each treated tooth quadrant was used to punch a hole in the solidified agar and 1 ml. of fresh pooled saliva from at least two donors was pipetted into the hole. The tooth quadrant was then replaced in the hole making sure that all surfaces were in good contact with the agar and saliva. The tube containing the imbedded tooth quadrant was placed in a closed container (partly filled with water for humidifying purposes), which in turn was placed in a constant temperature box maintained at 37° C.

Demineralization of the tooth quadrants treated in the aforesaid manner was quantitatively estimated by visual examination using two graders who appraised the area of each surface which had decalcified (formed "white spots"), estimating this area to the nearest 10%.

Demineralization was also measured by photographing the treated teeth while irradiated with ultraviolet light. The demineralized area of the tooth fluoresces at a lower intensity than the intact portion and estimates of the extent of involvement are determined from the film record.

To determine the degree of protection afforded by the test compositions, the percent area of demineralization of the coded samples treated tooth quadrant and an untreated control tooth quadrant exposed to the same conditions was determined. Table 3 below sets forth the results of replicate agar saliva tests on a representative composition of this invention. The tooth quadrants were treated daily with the test composition in the above-described manner and were examined after 3 and 6 days in the agar saliva medium. Control tooth quadrants were treated with distilled water in the same manner.

Table 3

| Composition (pH 5.0) | F, p.p.m. | In (III), p.p.m. | Av. Percent Area Decalcified | |
|---|---|---|---|---|
| | | | 3 days | 6 days |
| Ex. XVI — Aqueous solution of NaF and $InCl_3$. | 1,000 | 30 | 3.1 | 4.6 |
| Control ($H_2O$) | | | 31.0 | 55.0 |

The above results reveal that the composition affords substantial protection to dental enamel under conditions which are similar to those prevailing in the human mouth. The water-treated control teeth are unprotected from the caries inducing medium and a high degree of demineralization occurs. The composition of Example XVI on the other hand provides a substantial degree of protection to the teeth and demineralization is relatively slight.

Dentifrice compositions, especially toothpaste, containing the In (III) and F combinations of this invention are preferred oral compositions for caries prophylaxis. Toothpaste compositions typically contain an abrasive material, sudsing agent, binders, humectants, flavoring and sweetening agents. It is desirable to employ components which have a reduced tendency to react with the indium and fluoride ions to render these ions unavailable for reaction with the dental enamel. For example, abrasive materials which do not form insoluble salts with or adsorb indium and fluoride ions are preferred.

A preferred class of abrasives which are highly compatible with the ionic components of a dentifrice are water-impervious, cross-linked, thermosetting, highly polymerized resins such as particulate condensation products of melamine and urea or formaldehyde. A variety of resinous abrasive materials which are suitable for use in the compositions of this invention are disclosed by Cooley et al. in U.S. Patent 3,070,510, granted December 25, 1962.

Another preferred class of abrasives for use in conjunction with indium and fluoride ions in the dentifrice embodiments of this invention are the insoluble condensed phosphates. Examples of such insoluble condensed phosphates include calcium pyrophosphate, calcium polymetaphosphate, and insoluble sodium polymetaphosphate. Mixtures of abrasives can also be used.

The total amount of abrasive materials in the dentifrice embodiments of this invention can range from 0.5% to 95% by weight of the dentifrice. Preferably, toothpastes contain from 20% to 60% by weight, and tooth powders contain from 60% to 95% by weight.

Suitable sudsing agents for use in the compositions of this invention are those which are reasonably stable and form suds within the essential acid pH range. Examples of suitable sudsing agents include, but are not limited to, water-soluble salts of alkyl sulfate having from 10 to 18 carbon atoms in the alkyl radical, such as sodium lauryl sulfate; water-soluble salts of sulfonated monoglycerides of fatty acids having from 10 to 18 carbon atoms, such as sodium coconut monoglyceride sulfonate; salts of fatty acid amides of taurine, such as sodium N-methyl-N-palmitoyl tauride; salts of fatty acid esters of isethionic acid; and substantially saturated aliphatic acyl amides of saturated aliphatic monoaminocarboxylic acids having 2 to 6 carbon atoms and in which the acyl radical contains 12 to 16 carbon atoms, such as sodium N-lauroyl sarcoside. Mixtures of two or more sudsing agents can also be used.

The sudsing agent can be present in the dentifrice compositions of this invention in an amount from 0.5% to 5.0% by weight.

In preparing toothpastes, it is necessary to add some thickening material. Preferred thickening agents are hydroxyethyl cellulose and water-soluble salts of cellulose ethers such as sodium carboxymethyl cellulose and sodium carboxymethyl hydroxyethyl cellulose. Natural gums such as gum karaya, gum arabic, and gum tragacanth can also be used as thickeners, but may tend to cause undesirable odors or flavors in some formulations. Colloidal magnesium aluminum silicate or finely divided silica can be used as a part of the thickening agent to improve the texture of the toothpaste. Thickening agents in an amount of from 0.5% to 5.0% by weight of toothpaste can be used to prepare a satisfactory product.

It is also desirable to include some humectant material in a toothpaste to keep it from hardening. Suitable humectants include glycerine, sorbitol, and other edible polyhydric alcohols. The humectant can comprise up to about 36% by weight of the toothpaste composition.

Suitable flavoring agents include oil of wintergreen, oil of peppermint, oil of spearmint, oil of sassafras, and oil of anise. Sweetening agents which can be used include saccharin, dextrose, levulose, and sodium cyclamate.

Several representative oral compositions for caries prophylaxis which are embodiments of this invention are set forth in the following examples.

EXAMPLE XVI

A toothpaste of the following composition is prepared by conventional means.

| | Percent by weight |
|---|---|
| Methyltriethanol ammonium fluoride | [1] 48 |
| Indium perchlorate | [2] .018 |
| Abrasive (precipitated melamine formaldehyde condensation product) | 35.00 |
| Sorbitol (30% in water) | 20.00 |
| Glycerine | 30.00 |
| Hydroxyethylcellulose | 2.00 |
| Sodium lauryl sulfate | 1.51 |
| Magnesium aluminum silicate | .40 |
| Saccharin | .12 |
| Flavor | 0.85 |
| Coloring | 0.47 |
| Sodium hydroxide | 0.23 |
| Water | Balance |

Acetic acid to pH 4.5
Ratio In (III) to F, 1:10.

[1] 500 p.p.m. F.
[2] 50 p.p.m. In.

This composition possesses good consumer properties. When diluted with water and brushed upon teeth in the conventional manner, this toothpaste markedly reduces the solubility of the dental enamel without demineralizing the tooth structure.

Laurylamine hydrofluoride, dodecyl-trimethyl ammonium fluoride, lysine hydrofluoride or mixtures of these salts in a quantity sufficient to provide 500 p.p.m. of fluorine can be used in place of methyltriethanol ammonium fluoride with substantially equivalent results.

EXAMPLE XVII

A toothpowder which constitutes another embodiment of this invention has the following composition:

| | Percent by weight |
|---|---|
| Calcium pyrophosphate | 95.00 |
| Sodium lauryl sulfate | 1.00 |
| Palladium fluoride (PdF$_2$) | [1] 7.6 |
| Indium chloride (InCl$_3$) | [2] .004 |
| Secondary sodium citrate | 1.50 |
| Flavoring | 1.45 |
| Saccharin | .286 |

Ratio In (III) to F, 1:100.

[1] 2000 p.p.m F.
[2] 20 p.p.m. In.

This composition, when diluted with water has a pH of 5.5. When brushed upon the teeth in the conventional manner, the composition reduces the solubility of the dental enamel, but does not cause demineralization of the tooth structure.

The indium chloride employed in this example can be replaced with indium fluoride (InF$_3$·3H$_2$O), indium nitrate [In(NO$_3$)$_3$·3H$_2$O], indium perchlorate

[In(ClO$_4$)$_3$·8H$_2$O], In$_2$(SO$_4$)$_3$ or mixtures of these salts in a quantity sufficient to provide 20 p.p.m. In (III) ion, with substantially the same results.

EXAMPLE XVIII

A mouthwash is prepared having the following composition:

| | Percent by weight |
|---|---|
| Ethyl alcohol (50%) | 81.875 |
| Glycerine | 12.00 |
| Cetyl pyridinium fluoride | [1] 5.11 |
| Indium fluoride (InF$_3$) | [2] .015 |
| Acetic acid | 1.00 |

Ratio In (III) to F, 1:30.5.

[1] 3000 p.p.m. F.
[2] 50 p.p.m. F, 100 p.p.m. In.

Prior to use this composition is diluted by adding 2 ml. of the concentrate to 20 ml. of water. The resulting solution has a pH of 6.0 and constitutes an effective composition for caries prophylaxis, yielding a marked reduction in enamel solubility when swished in the oral cavity in the usual manner twice daily over a period of two to three months. Moreover this composition will not demineralize the tooth structure.

The cetyl pyridinium fluoride employed in this example can be replaced by dodecyl triethyl ammonium fluoride, phenyl trimethyl ammonium fluoride, lauryl benzyl dimethyl ammonium fluoride or phenoxyethyl cetyl dimethyl ammonium fluoride in an amount sufficient to provide 3000 p.p.m. of fluoride, without substantial effect on the enamel solubility reducing properties of the composition.

EXAMPLE XIX

A chewing gum is prepared having the following composition.

| | Percent by weight |
|---|---|
| Gum base | 21.30 |
|     Estergum, 30 parts | |
|     Coumarone resin, 45 parts | |
|     Latex (dry), 15 parts | |
|     Paraffin wax (M.P. 180° F.), 10 parts | |
| Sugar | 59.50 |
| Corn syrup (Baumé 45) | 18.20 |
| Flavoring | Q.S. |
| Glycine hydrofluoride | [1] .10 |
| Indium chloride ($InCl_3$) | [2] .04 |
| Citric acid | 1.00 |
| Ratio In (III) to F, 1:1. | |

[1] 200 p.p.m. F.
[2] 200 p.p.m. In.

This composition provides an effective means for caries prophylaxis when chewed in the customary fashion. Sufficient fluoride and indium is ionized in the course of chewing this product in saliva to reduce the solubility of the dental enamel. The tooth structure is not demineralized even after prolonged exposure to this composition.

The glycine hydrofluoride of this composition can be replaced with alanine hydrofluoride, serine hydrofluoride, leucine hydrofluoride, or lysine hydrofluoride in a quantity sufficient to provide 200 p.p.m. of fluorine ion, with substantially the same results.

EXAMPLE XX

A prophylaxis paste for use in the dental office for removal of stains, etc. after removal of calculus is formulated as follows:

| Composition A: | Parts by weight |
|---|---|
|     Navajo pumice | 77.1 |
|     $TiO_2$ | 4.0 |
|     Glycerine | 17.757 |
|     Hydroxyethylcellulose | .222 |
|     Saccharin | .326 |
| Composition B: | |
|     Sodium fluoride | [1] 12.2 |
|     Indium chloride | [2] .015 |
|     Water | 87.785 |
| Ratio In (III) to F, 1:709. | |

[1] 55,190 p.p.m. F.
[2] 77.84 p.p.m. In (III).

Prior to use, 5.5 gm. of composition A are mixed with composition B to attain the desired texture. The paste is then applied to all the tooth surfaces with a rubber prophylactic cup used in the conventional manner.

The amount of In (III) and F ion provided by the above composition will, of course, vary depending on the amount of composition B employed. This composition is highly effective in reducing the solubility of dental enamel. No demineralization of tooth structure is observed when teeth treated with this composition are examined in accordance with the hereinbefore described technique.

What is claimed is:

1. An oral composition for caries prophylaxis comprising (1) at least one water-soluble dental enamel solubility reducing fluoride which in acidic aqueous solution demineralizes dental enamel, in a quantity sufficient to provide from about 25 to about 7500 parts of fluoride ion per million parts of the total composition and (2) at least one water-soluble indium salt, in a quantity sufficient to provide a weight ratio of indium (III) to fluorine within the range from about 1:1 to 1:2000, said composition having a pH within the range from about 2.5 to about 6.0 in aqueous solution.

2. The composition of claim 1 wherein the water-soluble fluoride is sodium fluoride.

3. The composition of claim 1 wherein the water-soluble fluoride is methyltriethanol ammonium fluoride.

4. The composition of claim 1 wherein the water-soluble indium salt is indium chloride.

5. The composition of claim 1 wherein the water-soluble indium salt is indium fluoride.

6. A dentifrice composition comprising (1) at least one enamel solubility reducing water-soluble fluoride which in acidic aqueous solution demineralizes dental enamel, in a quantity sufficient to provide from about 100 to about 4000 p.p.m. of fluoride ion, and (2) at least one water-soluble indium salt in a quantity sufficient to provide a weight ratio of indium (III) to fluorine within the range from about 1:7 to 1:100, said composition having a pH within the range from about 2.5 to about 6.0 in aqueous solution.

7. A toothpaste comprising (1) from 20% to 60% by weight of an abrasive material, (2) from 0.5% to 5.0% by weight of a sudsing agent, (3) from 0.5% to 5.0% by weight of a thickening agent, (4) up to about 35% by weight of a humectant, (5) a water-soluble enamel solubility reducing fluoride which in acidic aqueous solution demineralizes dental enamel, in an amount sufficient to provide from about 100 to about 2000 parts of fluoride ion per million parts of toothpaste, (6) a water-soluble indium salt in an amount sufficient to provide a weight ratio of In (III) ions to said fluoride ions within the range from 1:7 to 1:100, and (7) the balance substantially water, the pH of said composition being within the range from about 2.5 to about 6.0.

8. The composition of claim 7 wherein the fluoride is methyltriethanol ammonium fluoride.

9. The composition of claim 7 wherein the fluoride is sodium fluoride.

No references cited.